No. 869,104. PATENTED OCT. 22, 1907.
P. PLATE.
POTATO HARVESTER.
APPLICATION FILED MAR. 29, 1907.

Witnesses:
Alfred Bühning
Mary Peters.

Inventor:
Paul Plate
by Erich Peters
his attorney.

UNITED STATES PATENT OFFICE.

PAUL PLATE, OF SCHLOSS BUDDENBURG, NEAR LÜNEN, GERMANY.

POTATO-HARVESTER.

No. 869,104.             Specification of Letters Patent.           Patented Oct. 22, 1907.

Application filed March 29, 1907. Serial No. 365,250.

*To all whom it may concern:*

Be it known that I, PAUL PLATE, forester, a subject of the German Emperor, and resident of Schloss Buddenburg, near Lünen a. d. Lippe, Westfalen, Germany, have invented certain new and useful Improvements in Potato-Harvesters, of which the following is a specification.

This invention relates to potato harvesters and especially to a novel framework for such harvesters, one of the objects of my invention being to provide a wheeled framework for potato harvesters the wheels whereof may be adjusted to the width at which the furrows of the field are apart; a further object of my invention is to provide a wheeled framework for potato harvesters which allows of the potato digging plow, elevator, delivering chute and connected mechanism being arranged outside the carrying wheels.

Figure 1:
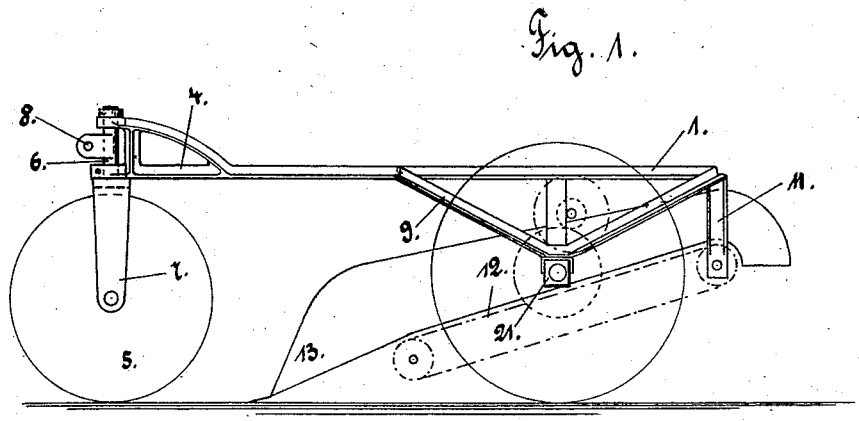
Figure 2:
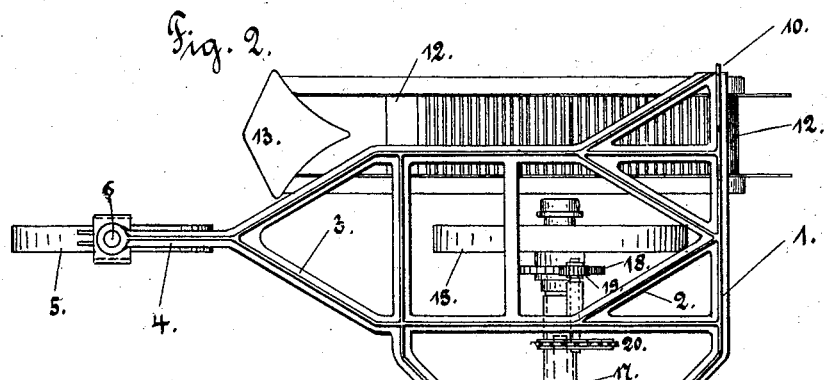
Figure 3:
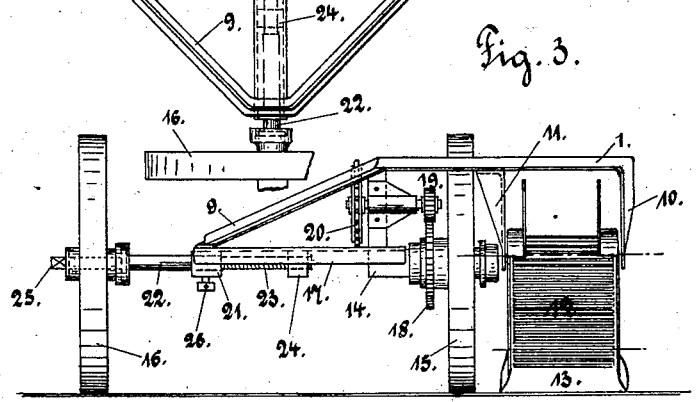

In the annexed drawings forming a part of this specification and wherein similar reference numerals designate like parts in the different figures, Figure 1 is a side elevation view of the framework, the operating members being diagrammatically shown. Fig. 2 is a top plan view of same. Fig. 3 shows a rear elevation view.

The framework comprises a rectangular frame 1 which is reinforced by means of oblique struts 2. This frame is continued at its front end by an isosceles triangle 3 whereto is connected at the front corner, the guide member 4 for the front or guide wheel 5 of the harvester. The said guide member 4 is formed of a vertically arranged fork in which the guiding trunnion 6 of the guide fork 7 of the wheel 5 is mounted in a suitable manner so as to allow of its rotation. Mounted on the said trunnion 6 is the member 8 to which the pole shaft is connected.

Connected to the main frame 1 of the framework are side struts forming a triangle and projecting downwards and sidewards from the said main frame 1. The said main frame is also provided on the other side with a projecting structure to which is connected at right angles a vertical supporting member 10 which together with a bearing support 11 secured in transverse alinement with support 10 to the frame, forms the supporting means for the upper drum shaft of the elevator 12 of the harvester the plow like end 13 of this elevator receiving the potatoes as well as the digged earth, while the elevator itself rejects the potatoes beyond its upper drum after the earth accompanying the potatoes has been separated therefrom by sieving.

The oblique struts 9 together with a suitable reinforcing structure 14 on the frame 1 of the harvester form the support for the main wheels 16 and 15 of the latter. Arranged between the struts 9 and 14 is a horizontal beam 17 on the inner end whereof is secured the axle for the driving wheel 15. With the latter are connected in an otherwise well known manner the toothed and sprocket wheels 18, 19 20 intended to drive the elevator. At the opposite (outer) end of the beam 17, *i. e.* at the point of connection of the struts 19, a bearing 21 is arranged for the circular axle 22 of the second main wheel 16. The said circular axle 22 is provided at its free end with screw threads 23 which are screwed into a nut 24 rigidly secured to the beam 17. The other end 25 of the axle 22 which projects beyond the nave of the wheel 16 is square with a view of receiving a suitable key and of lengthening or shortening by rotating it, that part of the axle which projects from the framework; the axle is secured in position by means of a stop screw 26 arranged in the bearing 21. In the above described manner it is possible to adjust both main wheels 16 and 15 to the width of the furrows of the field. The driving wheel thereby runs on the groove made by the front or leading wheel 5 thus affording an easy direction of the frame work.

Having now fully described my said invention what I claim and desire to secure by Letters Patent is:

1. In a wheeled potato harvester having an elevator the combination with a substantially rectangular main frame of a substantially triangular frame made integral with the said main frame at the front part thereof and carrying the front guiding wheel, rigid means for supporting one of the main wheels under the said main frame and in line behind the said front guide wheel, means integral with the said main frame and supporting the other main wheel of the harvester at one side of the said main frame, means for controlling the distance between the two main wheels, and means on the other side of the said main frame for supporting the elevator of the potato harvester on the outside of the first named main wheel substantially as and for the purpose set forth.

2. In a potato harvester having an elevator the combination of a substantially rectangular frame, reinforcing members for the said frame, a triangular front prolongation, a supporting beam on the said triangular front prolongation, a front guide wheel supported in the said supporting beam, a triangular side frame sloping down at one side of the said frame, a vertically descending bracket secured to the said frame near the beginning of the said sloping side frame, a horizontal cross beam secured to the lower ends of the said triangular frame and the said bracket, an inner axle rigidly secured to the said cross beam, a driving wheel mounted on the said stationary axle in line with the said front guide wheel, an outer axle mounted on the said cross beam, means for longitudinally adjusting the said outer axle, means for securing same in its adjusted position, a second main wheel on the said outer axle, a horizontal triangular frame secured to the said rectangular main frame on the opposite side of the said sloping frame, an outer vertically depending strut on the said horizontal triangular frame, a vertical depending bracket secured to the said rectangular main frame and forming with the said descending bar the bearings for the upper drum of the elevator arranged outside the wheel track, substantially as and for the purpose set forth.

3. In a wheeled potato harvester having an elevator the combination with a substantially rectangular main frame, of reinforcing struts in the said main frame, a substantially triangular front prolongation made integral with the said main frame and pivotally supporting the said front guiding wheel of the harvester a substantially triangular side extension of the said main frame, made integral therewith and sloping down sidewards, a vertically descending bracket secured to the said main frame at substantially the middle part of one side thereof, a horizontal cross beam secured to the lower ends of both the said sloping extension and the said bracket, an inner axle rigidly secured to the inner end of the said cross beam, one of the main wheels of the harvester mounted on the said inner axle in line with the said guiding wheel, a bearing secured to the outer end of the said cross beam, a cylindrical axle mounted in the said bearing and having a square outer end and a screw threaded inner one, a nut secured to the said cross beam and receiving the said screw threaded end of the axle, the second main wheel rotatably mounted on the said adjustable axle inside the said square end thereof, a set screw in the said bearing and adapted to immobilize the said cylindrical axle in its adjusted position, a substantially triangular horizontal extension projecting sidewards from the rear portion of the said main frame on the side opposite to that wherefrom projects the sloping extension, a descending strut at the end of the said horizontal extension, a descending bracket secured to the underside of the said frame outside the said non adjustable main wheel, a bearing on each of the ends of both the latter bracket and the vertical strut, these bearings being adapted to journal the upper shaft of the elevator of the harvester outside the said non adjustable main wheel, driving means between the latter and the elevator, substantially as and for the purpose set forth.

In testimony whereof I have hereunto set my hand in presence of two witnesses.

PAUL PLATE. [L. S.]

Witnesses:
  VON POSECK,
  F. RÜHENBERK.